United States Patent [19]

Ueno et al.

[11] 4,320,153

[45] Mar. 16, 1982

[54] METHOD FOR PRODUCING REFRIGERATED GROUND FLESH OF FISH OF HIGH ELASTICITY

[75] Inventors: Ryuzo Ueno, Nishinomiya; Tatsuo Kanayama; Toshio Matsuda, both of Itami; Kunihiko Tomiyasu, Nishinomiya; Shigeo Inamine, Kobe, all of Japan

[73] Assignee: Kabushiki Kaisha Ueno Seiyaku Oyo Kenkyujo, Osaka, Japan

[21] Appl. No.: 136,165

[22] Filed: Mar. 31, 1980

Related U.S. Application Data

[63] Continuation of Ser. No. 6,366, Jan. 25, 1979, abandoned.

[30] Foreign Application Priority Data

Mar. 8, 1978 [JP] Japan ................................. 53-25520

[51] Int. Cl.³ ..................... A23L 1/272; A23L 1/325
[52] U.S. Cl. .................................. 426/643; 426/574; 426/613; 426/658
[58] Field of Search ............... 426/574, 643, 573, 646, 426/613, 524, 658, 651

[56] References Cited

U.S. PATENT DOCUMENTS

| | | | |
|---|---|---|---|
| 2,566,410 | 9/1951 | Griffin | 426/651 |
| 2,904,440 | 9/1959 | Dimick et al. | 426/658 |
| 3,922,372 | 11/1975 | Hassegawa | 426/643 |
| 3,959,517 | 5/1976 | Niki et al. | 426/643 |
| 4,118,517 | 10/1978 | Niki et al. | 426/643 |
| 4,168,323 | 9/1978 | Inamine et al. | 426/643 X |

FOREIGN PATENT DOCUMENTS

| | | | |
|---|---|---|---|
| 1492690 | 10/1969 | Fed. Rep. of Germany | 426/646 |
| 49-4371 | 1/1974 | Japan | 426/646 |
| 51-32760 | 3/1976 | Japan | 426/643 |
| 51-86165 | 7/1976 | Japan | 426/646 |

*Primary Examiner*—Marc S. Alvo
*Attorney, Agent, or Firm*—Sherman & Shalloway

[57] ABSTRACT

An improved method for producing refrigerated flesh of fish, which comprises mixing ground fish flesh with (1) a powdery or granular solid colloid composed of 70 to 99% by weight of a crystallized and stabilized solid sugar alcohol such as sorbitol and 30 to 1% by weight of fine particles of an oil or fat such as colza oil dispersed in the sugar alcohol and (2) a powdery or granular polyphosphate, and refrigerating the mixture. The amounts of additives (1) and (2) are 1 to 10%, and 0.1 to 0.5%, respectively, based on the weight of the ground flesh. Pastes (such as "kamaboko") of seafood prepared from the refrigerated fish have better whiteness and elasticity than conventional products.

14 Claims, No Drawings

METHOD FOR PRODUCING REFRIGERATED GROUND FLESH OF FISH OF HIGH ELASTICITY

This is a continuation of application Ser. No. 006,366, filed Jan. 25, 1979, now abandoned.

This invention relates to a method for producing refrigerated ground flesh of fish having improved quality.

Elasticity and whiteness are important factors in evaluating the quality of seafood pastes. The former is particularly significant since their quality is greatly affected by the degree of elasticity. Elasticity of seafood paste is a unique property which quite differs from the elasticity obtained from gums, agar and gelatin which are used to form the body of general foodstuffs. Addition of these substances in an attempt to strengthen the elasticity of seafood pastes will only result in elasticity having a different feeling from the inherent elasticity of the seafood pastes. Attempts have heretofore been made to add starch or gluten to "kamaboko", a typical seafood paste, but the resulting elasticity is different in nature from that which is ascribable to the elasticity-forming ability of the starting ground fish. In low-grade "kamaboko" now on the market, however, as much as about 10% of starch or about 1 to 3% of gluten is used for increasing elasticity. Elasticity intensifiers capable of giving elasticity having equivalent feeling to the elasticity of seafood pastes has therefore been desired, but no feasible elasticity intensifier which can achieve such a desire has been developed.

To obtain seafood pastes having good elasticity and whiteness, it is most desirable to use high quality ground flesh of fresh fish having a white flesh as a raw material. In recent years, it has become gradually difficult to catch fish available as materials for ground flesh of good quality because of various restrictions imposed on the fishing area and of the decrease of fish resources. When an attempt is made to cope with the shortage of raw materials by increasing the yield of ground flesh, the quality of whiteness of the resulting ground flesh will be deteriorated. As a result, the elasticity and whiteness of fish pastes prepared from the resulting ground fish are reduced, and this adversely affects their market value. The same problem arises when ground flesh is prepared from fish whose flesh is not white. It is strongly desired therefore to produce ground fish flesh, especially the refrigerated one, having improved properties capable of giving increased elasticity and whiteness to seafood pastes (to be referred to as the ability to impart elasticity and increases whiteness).

It is an object of this invention to provided refrigerated flesh of fish which can meet this desire.

It has been found that the refrigerated ground flesh of fish which achieves this object can be produced by mixing the ground flesh with (1) a powdery or granular solid colloid composed of 70 to 99% by weight of a crystallized and stabilized solid sugar alcohol and 30 to 1% by weight of fine particles of an oil or fat dispersed in it and (2) a powdery or granular polyphosphate, and refrigerating the mixture.

When the solid colloid (1) is added to the ground flesh, the sugar alcohol dissolves in the ground flesh whereas the fine particles of oil or fat are dispersed in it. Because the solid colloid is powdery or granular, a homogeneous dispersion can be obtained within a short period of time. Hence, no heterogeneity is observed when the colloid is added to the ground flesh.

The solid colloid (1) is produced by dispersing an oil or fat as fine particles in a heat-melted mass or an aqueous solution of a sugar alcohol, and adding a seed crystal to the resultant dispersion to solidify and crystallize it. The resultant solid colloid is pulverized or granulated before, during or after drying.

The solid colloid (1) consists of 70 to 99%, preferably 85 to 98%, of the sugar alcohol and 30 to 1%, preferably 15 to 2%, of the oil or fat. The particulate oil or fat is dispersed in the crystallized and stabilized solid upper alcohol (dispersing medium). It is in the form of a powder or granules with a particle diameter of 16 mesh or smaller, preferably 20 to 150 mesh. The "mesh" size used in this application is based on the W. S. Tyler Standard. When the amount of the sugar alcohol in the solid colloid is less than 70%, a part of the oil or fat is likely to separate and bleed out onto the surface of the solid colloid. When the amount of the oil or fat is larger than 30%, the same bleed-out phenomenon might occur since the amount of the sugar alcohol naturally falls below 70%. When the particle diameter of the solid colloid is greater than 16 mesh, it is difficult to disperse it homogeneously in the ground fish. In order to render the mixing operation easy by preventing the scattering of the solid colloid, its particle diameter should preferably be not smaller than 150 mesh.

Sorbitol, mannitol, and maltitol, for example, are used as the sugar alcohol either alone or as mixtures. Sorbitol is especially preferred.

The oil or fat may be ordinary edible oils and fats. Examples of vegetable oils and fats are soybean oil, cotton seed oil, colza oil, olive oil, corn oil, rice oil, and sesame oil, and examples of animal oils and fats are beef tallow, lard and fish fats. Hardened products of these oils and fats can also be used. These oils and fats are used either alone or as mixtures.

The sugar alcohol is a strongly hydrophilic substance and is very easily soluble in water. Sorbitol and maltitol have strong hygroscopicity. Usually, when such a hydrophilic substance is simply mixed with an oil or fat, two separate layers are formed, and the oil or fat constitutes the upper layer. Accordingly, it is usually necessary to add a surface-active agent when dispersing an oil or fat in a hydrophilic substance. It is surprising to note however that when an oil or fat is added to a stirred liquid form (melt or aqueous solution) of a sugar alcohol, the oil or fat can be easily dispersed with relative homogeneiety and stability in the absence of a surface-active agent despite the fact that the sugar alcohol is a hydrophilic substance. It is quite unexpected that the sugar alcohol can be solidified and crystallized while this dispersed state is being maintained, and a stable solid colloid can be formed. The solid colloid obtained is free of tackiness, and no oil bleed-out is observed.

These unexpected results are due presumably to the fact that the sugar alcohol acting as a dispersing medium has the property of solidifying to a glassy state and forming sticky crystals. For example, when sodium chloride is crystallized from solution, the crystal particles obtained have a very high purity and it is virtually impossible to include large amounts of impurities in the crystal particles (ordinary recrystallization utilizes this principle). In contrast, when as is the case with the present invention, the entire dispersion system first solidifies to a glassy state, and crystallization proceeds simultaneously, the dispersing medium crystallizes while it is completely devoid of flowability. The dispersing medium (sugar alcohol) can therefore be crystallized while it contains a large amount of dispersed particles (oil or fat). When the crystals of the dispersing medium are in the form of fine particles and have stickiness, these crystals can be kept in the form of a relatively coarse powder or granules while containing dispersed particles inside.

The solid colloid in the present invention can be prepared by any of the following methods.

(i) A method which comprises heating the sugar alcohol to a temperature above its melting point, adding the oil or fat to the melt, stirring the mixture to disperse the oil or fat in the form of fine particles, cooling the molten mixture containing the dispersed oil or fat, and then adding a seed crystal to solidify and crystallize the sugar alcohol.

(ii) A method which comprises dispersing the oil or fat in the form of fine particles in an aqueous solution of the sugar alcohol at an elevated temperature, cooling the resultant aqueous dispersion, adding a seed crystals to solidify and crystallize the sugar alcohol, and then drying the product.

(iii) A method which comprises heating the aqueous dispersion obtained in method (ii) to a temperature above the melting point of the sugar alcohol preferably under reduced pressure to remove water, cooling the resulting melt having the oil or fat dispersed in it, and adding a seed crystal to solidify and crystallize the sugar alcohol.

In the methods (i), (ii) and (iii), the oil or fat should be liquid at the time when it is dispersed in the sugar alcohol. When the oil or fat used is not liquid, it may be liquefied in advance by heating it to a temperature above its melting point, or heating it together with the sugar alcohol or in an aqueous solution of the sugar alcohol. In order to disperse the oil or fat in the form of fine particles, the mixture is stirred by using an ordinary stirring device such as a homomixer or homogenizer. As stated hereinabove, the addition of a surface-active agent is not necessary for dispersion because of the unique property of the sugar alcohol, but if desired, the addition of less than 0.5% of a surfactant is permissible.

A preferred seed crystal to be added to promote crystallization is a powdery sugar alcohol, but the powdery solid colloid (1) may also be used. The amount of the seed crystal is usually 2 to 30% by weight. The cooling and the addition of seed crystal are performed in any desired sequence. For example, the seed crystal may be added after cooling, or the cooling may be performed after adding the seed crystal. Alternatively, the seed crystal may be added while cooling. The resulting solid colloid is pulverized by using an ordinary pulverizer or crusher, and preferably sieved to adjust its particle size to smaller than 16 mesh. Before the mixture is not fully cooled and solidified after the addition of the seed crystal, it may be formed into granules by using a granulator, for example.

The solid colloid (1), irrespective of the method of its preparation, should be such that the sugar alcohol is in the completely crystallized state and stable, and should be a powder or granules having a particle size of 16 mesh or smaller. In the uncrystallized state, the solid colloid having a particle size smaller than 16 mesh will be caked and become useless on standing for a while under a slight load. In the production of refrigerated ground flesh of fish, it is necessary to disperse the solid colloid completely in a mass of fish protein at a temperature of about 10° C. by stirring for about 5 to 15 minutes. With a caked colloid, this is quite impossible.

The oil or fat dispersed as particles in the sugar alcohol greatly affects the crystallization of the sugar alcohol. When there is only the sugar alcohol (that is, when no fat or oil is present), the addition of a seed crystal does not afford a fully crystallized state. The sugar alcohol in such a state is unstable, and very much tends to be caked to larger particles. Such particles scarcely crystallize on standing at room temperature. In contrast, when the oil or fat is dispersed in the sugar alcohol, the crystallization of the sugar alcohol proceeds very smoothly. Moreover, the addition of seed crystal slows the speed of solidification, and the treating operation is very easy. Since it is normally not expected that an oil or fat dissolves in a sugar alcohol, it is quite unexpected that such a phenomenon will occur. It is not clear what interaction exists between the sugar alcohol and the oil or fat.

It is also not known by what mechanism the addition of the solid colloid (1) has an effect of increasing the elasticity and whiteness of seafood pastes. When the oil or fat is added alone to ground fish flesh, no increase in elasticity and whiteness obtainable by the addition of the solid colloid (1) is observed. It is assumed that dispersion of the oil or fat in fine particles in the ground flesh will bring about an action which is not ordinarily conceivable. Preferably, the oil or fat is present as smallest possible particles in the solid (1). The particle diameter of the dispersed particles of the oil or fat is not more than $20\mu$, preferably not more than $10\mu$.

In the method of this invention, the solid colloid (1) is added in an amount of 1 to 10% by weight, preferably 2 to 6% by weight, to ground fish flesh at the time of producing refrigerated ground flesh of fish. When the concentration of the oil or fat in the solid colloid (1) is high, the solid colloid may be used as a mixture with a sugar alcohol or a sugar to adjust the concentrations of these substances in the ground fish flesh to favorable ranges.

It is essential in the method of this invention to use about 0.1 to 0.5%, based on the weight of the ground flesh, of the polyphosphate (2) as an additive for preventing degeneration during chilling. If the powdery or granular solid colloid (1) is mixed in advance with the powdery or granular polyphosphate, the operation of admixing the ground fish flesh with these additives can be performed in a single step. Thus, this is an especially advantageous embodiment. Since the solid colloid (1) is very stable, it does not degenerate by such prior mixing. In an alternative embodiment, the polyphosphate (2) may be added at the time of producing the powder or granule of the solid colloid (1). The inclusion of the powder or granule of the solid colloid (1) of the polyphosphate (2) is desirable not only because it permits the operation of adding these additives to ground fish flesh in a single step, but also because the polyphosphate (2) dissolved disperses uniformly in the ground flesh.

Examples of the polyphosphate are sodium pyrophosphate, sodium tripolyphosphate, sodium metaphosphate, potassium pyrophosphate, potassium tripolyphosphate, potassium meta-phosphate, sodium tetrapolyphosphate and potassium tetrapolyphosphate. They may be used as mixtures if required.

The following Referential Examples (the production of a powdery or granular solid colloid) and Examples illustrate the present invention more specifically.

Referential Example 1

Sorbitol powder (400 g) was heated to 100° C. to melt it, and 50 g of cotton seed stearin was added. The mixture was vigorously stirred for 10 minutes by a homomixer to disperse the oil. The molten mass having the oil dispersed in it was placed in a small-sized kneader equipped with a jacket, and 50 g of sorbitol powder was added as a seed crystal. While mixing them with stirring, the mixture was cooled to solidify and crystallize the sorbitol. The resulting solid colloid was pulverized, and sieved to afford a powdery product having a particle size of not larger than 16 mesh. The product was found to contain 90% by weight of soroitol and 10% by weight of cotton seed stearin.

Referential Example 2

Sorbitol powder (360 g) was heated to 100° C. to melt it, and 30 g of cotton seed oil was added. The mixture was vigorously stirred for 10 minutes by a homomixer to disperse the oil. The molten mass having the oil dispersed was placed in a small-sized kneader equipped with a jacket, and 40 g of sorbitol powder was added as a seed crystal. While mixing them with stirring, the mixture was cooled to solidify and crystallize the sorbitol. The resulting solid colloid was pulverized, and sieved to form a powdery product having a particle diameter of 20 to 150 mesh. This product was found to contain 93% by weight of sorbitol and 7% by weight of the cotton seed oil.

Referential Example 3

650 g of an aqueous solution of sorbitol having a concentration of 70% by weight was heated to 90° C., and 10 g of lard was added. They were vigorously stirred for 10 minutes by a homomixer to disperse the lard. The dispersion was heated with hot water at 95° C. under reduced pressure by an evaporator while stirring it. Thus, the water was removed from it. The resulting molten mass having the fat dispersed in it was placed into a small-sized kneader equipped with a jacket, and 35 g of sorbitol was added as a seed crystal. They were mixed with stirring, and cooled to solidify and crystallize the sorbitol. The resulting solid colloid was pulverized and sieved to form a powdery product having a particle size of 20 to 150 mesh. This product was found to contain 98% by weight of sorbitol and 2% by weight of the lard.

Referential Example 4

Sorbitol powder (400 g) was heated to 110° C. to melt it, and 5 g of colza oil was added. They were stirred vigorously for 10 minutes by a homomixer to disperse the colza oil. The molten mass having the oil dispersed in it was transferred to a small-sized kneader equipped with a jacket, and with stirring, 95 g of sorbitol powder was added as a seed crystal. The mixture was cooled to solidify and crystallize the sorbitol. The resulting solid colloid was pulverized and sieved to form a powdery product having a particle diameter of 20 to 150 mesh. This product was found to contain 99% by weight of sorbitol and 1% by weight of colza oil.

Referential Example 5

Sorbitol powder (360 g) was heated to 100° C., and 30 g of refined cotton seed oil, and they were stirred by a homomixer for 10 minutes to disperse the oil. The molten mass having the oil dispersed in it was placed in a small-sized kneader equipped with a jacket. With stirring, a mixture consisting of 40 g of sorbitol powder, 10 g of sodium pyrophosphate and 10 g of sodium tripolyphosphate was added. The mixture was cooled to solidify and crystallize the sorbitol. The resulting solid colloid containing the polyphosphate was pulverized and sieved to form a product having a particle diameter of 20 to 150 mesh. The product was found to contain 89% by weight of sorbitol, 7% by weight of cotton seed oil, 2% by weight of sodium pyrophosphate and 2% by weight of sodium tripolyphosphate.

Referential Example 6

447 g of a 95% aqueous solution of sorbitol was heated to 110° C., and 25 g of soybean oil was added. They were stirred by a homomixer to disperse the oil. The aqueous dispersion was transferred to a small-sized kneader equipped with a jacket, and with stirring, 50 g of sorbitol powder was added as a seed crystal. The mixture was cooled to solidify and crystallize the sorbitol. The resultant solid colloid was dried with hot air at 60° C., pulverized, and sieved to afford a product having a particle diameter of 20 to 150 mesh. The product was found to contain 95% by weight of the sorbitol and 5% by weight of soybean oil.

Referential Example 7

Sorbitol powder (540 g) was heated to 110° C. to melt it, and 45 g of cotton seed oil was added. They were vigorously stirred for 10 minutes by a homomixer to disperse the oil. The resultant molten mass having the oil dispersed in it was transferred to a small-sized kneader equipped with a jacket, and 45 g of sorbitol powder was added as a seed crystal. With stirring, the mixture was cooled to solidify and crystallize the sorbitol. The resultant solid colloid was pulverized and sieved to afford a powdery product having a particle diameter of 16 to 150 mesh. The product was found to contain 93.0% by weight of sorbitol and 7.0% by weight of cotton seed oil.

EXAMPLE 1

The test for the effect of the method of this invention on refrigerated ground flesh of fish was tested as follows:

Alaska pollack caught two days before testing and refrigerated for 2 days was beheaded and eviscerated in a customary manner, washed with 10 times its volume of cold water three times, dehydrated, and then ground. The ground flesh had a water content of 85.4% by weight. The ground fish was divided into three lots each having a weight of 20 kg, and treated as follows:

Lot (I)

Sugar (4% by weight), 4% by weight of sorbitol powder and 0.3% by weight of a polyphosphate (a 1:1 powdery mixture of sodium pyrophosphate and sodium tripolyphosphate) were added to the ground flesh, and they were mixed for 10 minutes by a mixer. (Control 1)

Lot (II)

Sugar (4% by weight), 4% by weight of sorbitol powder, 0.3% by weight of the same polyphosphate as used in lot (I) and 0.3% by weight of cotton seed stearin were added to the ground flesh, and they were mixed in the same way as in lot (I). (Control 2)

Lot (III)

Sugar (4% by weight), 4.3% by weight of the solid colloid powder obtained in Referential Example 7 and 0.3% by weight of the same polyphosphate as used in lot (I) or (II) were added to the ground flesh, and they were similarly mixed. (Invention)

Ground fleshes obtained in (I), (II) and (III) above were each refrigerated at −30° C. in an air blast refrigerator. A period of 2 to 4 hours was required until they became frozen. The refrigerated flesh was thawed one day after refrigeration, and five months after refrigeration. Five kilograms of the ground flesh was mixed with 2.5% by weight of common salt and 5% by weight of starch, and they were mixed with stirring by a silent cutter for 13 minutes. The mixture was filled in a plastic casing, and heated in hot water at 90° for 30 minutes to form "kamaboko".

The various properties of the ground flesh and kamaboko were measured, and the results are shown in Table 1.

The Hunter whiteness was measured by using a digital color differential meter (model ND-101B of Nippon Denshoku Kogyo K.K.). The elasticity of kamaboko was evaluated by a sensual test and a mechanical test.

Sensual test

Tested by a panel of 7 specialists, and evaluated on the scale of 10 grades in which 10 represents very strong elasticity, 5 represent normal elasticity, and 1 indicates very weak elasticity. The average value of the panel was calculated.

Mechanical test

Measured by a food rheometer (a product of Nippon Seimitsu) by using a spherical plunger having a diameter of 5 mm. W (g) represents the load at breakage, and L (cm) represents the length of plunger intrusion at breakage.

As shown in Table 1, the test lot in accordance with this invention (Lot III to which the solid colloid powder of Referential Example 7 and the polyphosphate powder were added) showed superior elasticity in the sensual test and the mechanical test, as well as a high degree of whiteness.

accordance with the sorbitol/colza oil mixing ratios shown in Table 2.

Ground flesh of Alaska pollack was prepared in the same way as in Example 1. It was divided into six lots (I to VI) and treated as follows:

Lots (I) to (IV)

The solid colloid particles (Samples Nos. 1 to 4) shown in Table 2 were added in an amount of 8% based on the weight of the ground flesh as sorbitol (thus, the amount of the colza oil added was 1.2, 0.8, 0.4 and 0.05% by weight, respectively, as shown in Table 3). Then, a polyphosphate (a 1:1 powdery mixture of sodium pyrophosphate and sodium tripolyphosphate) was added in an amount of 0.3% based on the weight of the ground flesh. They were then mixed for 10 minutes by a mixer.

Lot (V)

Instead of the solid colloid powders shown in Table 2, 8% of sorbitol and 0.4% of colza oil were added to the ground flesh. Then, the polyphosphate was added in the same way as above, and the ingredients were mixed by a mixer.

Lot (VI)

Instead of the solid colloid powders shown in Table 2, sorbitol was added to the ground flesh in an amount of 8% based on the ground flesh. Then, the polyphosphate was added in the same way as above, and the ingredients were mixed by a mixer.

The treated ground flesh in each of lots (I) to (VI) was refrigerated in the same way as in Example 1, and partly taken out 3 days and 5 months after refrigeration. The fleshes were thawed at room temperature. In the same way as in Example 1, the quality of the thawed flesh and that of kamaboko prepared from the ground flesh were tested.

The results are shown in Tables 3 and 4. From these tables, it is seen that the test lots in accordance with this invention produce superior results.

TABLE 1 (Example 1)

| | Test lot | Water content (%) Ground flesh | Water content (%) Kamaboko | pH Ground flesh | pH Kamaboko | Whiteness Ground flesh | Whiteness Kamaboko | Elasticity of kamaboko Sensual | Mechanical test W | Mechanical test L |
|---|---|---|---|---|---|---|---|---|---|---|
| One day after refrigeration | (I) | 77.00 | 73.27 | 7.21 | 7.26 | 18.2 | 40.5 | 5.0 | 366 | 0.98 |
| | (II) | 76.78 | 73.22 | 7.24 | 7.25 | 18.3 | 40.9 | 5.1 | 370 | 0.99 |
| | (III) | 76.67 | 73.25 | 7.22 | 7.20 | 22.7 | 43.1 | 5.5 | 398 | 1.02 |
| Five months after refrigeration | (I) | 77.05 | 73.33 | 7.23 | 7.25 | 18.0 | 40.8 | 5.0 | 352 | 0.98 |
| | (II) | 76.58 | 73.31 | 7.22 | 7.20 | 18.2 | 41.0 | 5.0 | 355 | 0.98 |
| | (III) | 76.59 | 73.55 | 7.23 | 7.18 | 22.5 | 42.4 | 5.5 | 392 | 0.99 |

EXAMPLE 2

This Example was performed in order to ascertain the optimum amount of an oil or fat to be added to ground flesh of fish.

The solid colloid powders used in this Example were prepared by the method of Referential Example 4 in TABLE 2 (Example 2)

| (Sample No.) | Sorbitol:Oil | Oil content of solid colloid powder (%) |
|---|---|---|
| 1 | 80:12 | 13.0 |
| 2 | 80:8 | 9.1 |
| 3 | 80:4 | 4.8 |
| 4 | 80:0.5 | 0.6 |

TABLE 3

(Example 2)

Three days after the refrigeration

| Test lot | Type and amount of the solid colloid powder added | Amount added to ground flesh Sorbitol | Amount added to ground flesh Oil | Water content (%) Ground flesh | Water content (%) Kamaboko | pH Ground flesh | pH Kamaboko | Whiteness Ground flesh | Whiteness Kamaboko | Sensual test | Elasticity of Kamaboko Mechanical test W | Elasticity of Kamaboko Mechanical test L |
|---|---|---|---|---|---|---|---|---|---|---|---|---|
| (I) | No. 1 (9.2%) | 8% | 1.2% | 77.2 | 73.4 | 7.3 | 7.4 | 23.9 | 44.1 | 5.0 | 356 | 0.97 |
| (II) (invention) | No. 2 (8.8%) | 8% | 0.8% | 77.3 | 73.3 | 7.4 | 7.5 | 23.8 | 44.0 | 5.3 | 395 | 0.99 |
| (III) (invention) | No. 3 (8.4%) | 8% | 0.4% | 77.5 | 73.5 | 7.3 | 7.5 | 23.1 | 43.3 | 5.6 | 412 | 1.01 |
| (IV) | No. 4 (8.05%) | 8% | 0.05% | 77.6 | 73.7 | 7.3 | 7.6 | 19.0 | 40.8 | 5.1 | 355 | 0.98 |
| (V) | Sorbitol (8.0%) Oil (0.4%) | 8% | 0.4% | 77.6 | 73.6 | 7.4 | 7.5 | 19.0 | 41.0 | 5.0 | 352 | 0.97 |
| (VI) | Sorbitol (8.0%) | 8% | 0% | 77.7 | 73.6 | 7.5 | 7.6 | 18.8 | 40.7 | 5.1 | 350 | 0.98 |

TABLE 4

(Example 2)
Five months after the refrigeration

| Test lot | Water content (%) Ground flesh | Water content (%) Kamaboko | pH Ground flesh | pH Kamaboko | Whiteness Ground flesh | Whiteness Kamaboko | Elasticity of kamaboko Sensual test | Elasticity of kamaboko Mechanical test W | Elasticity of kamaboko Mechanical test L |
|---|---|---|---|---|---|---|---|---|---|
| (I) | 77.4 | 73.5 | 7.4 | 7.6 | 23.8 | 43.8 | 5.0 | 360 | 0.97 |
| (II) (invention) | 77.3 | 73.4 | 7.3 | 7.6 | 23.8 | 43.9 | 5.4 | 400 | 0.98 |
| (III) (invention) | 77.6 | 73.6 | 7.4 | 7.5 | 23.2 | 43.4 | 5.5 | 410 | 0.99 |
| (IV) | 77.45 | 73.7 | 7.5 | 7.6 | 18.5 | 40.5 | 5.0 | 345 | 0.97 |
| (V) | 77.4 | 73.6 | 7.4 | 7.5 | 18.6 | 40.7 | 4.9 | 341 | 0.97 |
| (VI) | 77.8 | 73.8 | 7.4 | 7.6 | 18.5 | 40.6 | 4.8 | 340 | 0.97 |

What is claimed is:

1. A method for producing a refrigerated ground flesh of fish, of high elasticity, which comprises mixing the ground flesh of fish with (1) 1 to 10%, based on the weight of the ground flesh, of a powdery or granular solid colloid having a particle size of smaller than 16 mesh, consisting essentially of 70 to 99% by weight of a crystallized and stabilized solid sugar alcohol and 30 to 1% by weight of fine particles of an edible vegetable or animal oil or fat dispersed in it, wherein the oil or fat is dispersed by adding said oil or fat to said sugar alcohol or an aqueous solution of said sugar alcohol while stirring said sugar alcohol or aqueous solution of said sugar alcohol to form a dispersion and wherein said colloid is obtained by cooling said dispersion of liquid fine particles of said oil or fat in either said sugar alcohol or said aqueous solution of said sugar alcohol and adding a seed crystal to solidify and crystallize the sugar alcohol, and pulverizng the crystallized solid colloid, and (2) 0.1 to 0.5%, based on the weight of the ground flesh, of a powdery or granular polyphosphate, in amounts sufficient to improve the elasticity of said fish flesh, and then refrigerating the mixture.

2. The method of claim 1 wherein the dispersion is obtained by heating the sugar alcohol to a temperature above its melting point, adding the oil or fat to the melt, stirring the mixture to disperse the oil or fat in the form of liquid fine particles.

3. The method of claim 1 wherein the solid colloid is obtained by dispersing the oil or fat in the form of liquid fine particles in a stirred aqueous solution of the sugar alcohol under heat, said and then drying the product.

4. The method of claim 1 wherein the dispersion is obtained by dispersing the oil or fat in the form of liquid fine particles in a stirred aqueous solution of the sugar alcohol under heat, heating the aqueous dispersion to a temperature above the melting point of the sugar alcohol to remove water and thus form a molten mass having the oil or fat dispersed in it.

5. The method of claim 2, 3 or 4 wherein the seed crystal is a powder of a sugar alcohol or a powder of the solid colloid (1).

6. The method of claim 1 wherein the polyphosphate is selected from the group consisting of sodium pyrophosphate, sodium tripolyphosphate, sodium tetrapolyphosphate, sodium metaphosphate, potassium pyrophosphate, potassium tripolyphosphate, potassium tetrapolyphosphate and potassium metaphosphate.

7. The method of claim 1 wherein the solid colloid (1) consists essentially of 85 to 98% of the sugar alcohol and 15 to 2% of the oil or fat.

8. The method claim 7 wherein the solid colloid has a particle diameter in the range of 20 to 150 mesh.

9. The method of claim 7 wherein the sugar alcohol is sorbitol.

10. The method of claim 9 wherein the ground flesh of fish is mixed with from 2 to 6% by weight of the ground flesh of the solid colloid.

11. The method of claim 1 wherein the powdery or granular polyphosphate (2) is contained in the powdery or granular solid colloid.

12. The method of claim 1 wherein the powdery or granular solid colloid (1) and the powdery or granular polyphosphate (2) are first mixed together and then the mixture of (1) and (2) is mixed with the ground flesh of fish.

13. The method of claim 1 wherein the oil or fat is a vegetable oil selected from the group consisting of soybean oil, cottonseed oil, colza oil, olive oil, corn oil, rice oil, and sesame oil.

14. The method of claim 1 wherein the oil or fat is an animal fat selected from the group consisting of beef tallow, lard and fish fat.

* * * * *

UNITED STATES PATENT AND TRADEMARK OFFICE
CERTIFICATE OF CORRECTION

PATENT NO. : 4,320,153
DATED : March 16, 1982
INVENTOR(S) : Ryuzo UENO, Tatsuo KANAYAMA, Kunihiko TOMIYASU and Shigeo INAMINE AND Toshio MATSUDA It is certified that error appears in the above—identified patent and that said Letters Patent is hereby corrected as shown below:

Claim 3 should read:

3. The method of Claim 1 wherein the dispersion is obtained by dispersing the oil or fat in the form of liquid fine particles in a stirred aqueous solution of the sugar alcohol under heat.

Signed and Sealed this

Twenth-eighth Day of September 1982

[SEAL]

Attest:

GERALD J. MOSSINGHOFF

Attesting Officer      Commissioner of Patents and Trademarks